W. W. ROSENFIELD.
WEIGHING MACHINE.
APPLICATION FILED NOV. 15, 1907.

936,362.

Patented Oct. 12, 1909.
3 SHEETS—SHEET 1.

Fig. 1.

Witnesses:
Inventor:

W. W. ROSENFIELD.
WEIGHING MACHINE.
APPLICATION FILED NOV. 15, 1907.

936,362.

Patented Oct. 12, 1909.
3 SHEETS—SHEET 3.

UNITED STATES PATENT OFFICE.

WILLIAM W. ROSENFIELD, OF NEW YORK, N. Y.

WEIGHING-MACHINE.

936,362.  Specification of Letters Patent.  Patented Oct. 12, 1909.

Application filed November 15, 1907. Serial No. 402,231.

*To all whom it may concern:*

Be it known that I, WILLIAM W. ROSENFIELD, a citizen of the United States, residing at New York city, county of New York, and State of New York, have invented certain new and useful Improvements in Weighing-Machines, fully described and represented in the following specification and the accompanying drawings, forming a part of the same.

This invention relates especially to weighing machines.

The invention aims generally to improve weighing machines of that class in which the indicating means is normally locked or held against turning and is only operable on the performance of some act, such as the insertion of a coin or check. The machine shown in my pending application filed in the United States Patent Office on the 9th day of January, 1907, No. 351,420, is of this class, and the present invention has been made especially with the idea of improving said machine in certain particulars which will be hereinafter fully pointed out and specifically set forth in the claims, and thereby making the machine more accurate and reliable in operation and better adapted to withstand hard usage.

Features of the invention may be found useful and may be employed in weighing machines differing in a greater or less degree from that shown in my said application, and in machines other than weighing machines.

A full understanding of the invention can best be given by a detailed description of a coin operated weighing machine of preferred form embodying the various features of the invention, and such a description will now be given in connection with the accompanying drawings showing such a machine. The platform and platform levers and their casing and the standards extending upward therefrom are not shown in the drawings as these parts may be of any suitable construction.

In said drawings.

Referring to the drawings, 10 represents the head casing which contains the weighing springs and connections and the indicating mechanism and other operating parts, and which is preferably of circular form and formed with solid sides and back and with a hinged front 11 formed of a glass plate carried by a circular frame. The dial plate 12 is mounted behind the glass front, being preferably formed and removably supported as shown and described in my said application No. 351,420.

Figure 2:
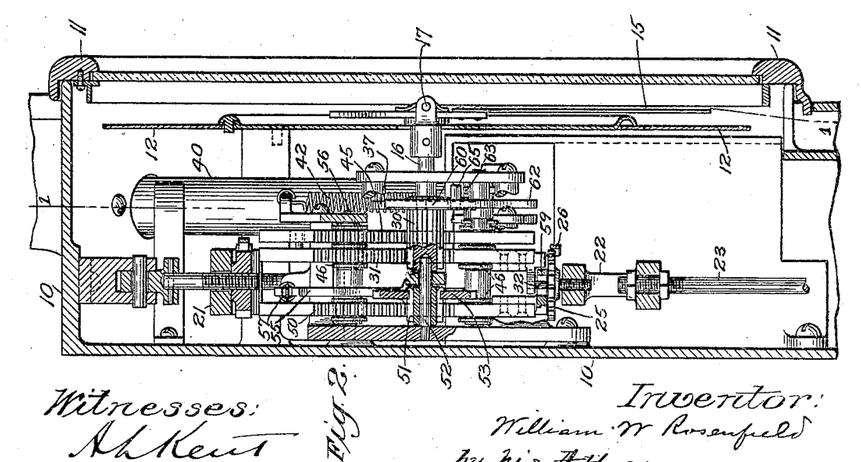
Fig. 2 is a vertical sectional view on line 2 of Fig. 1.
Figure 3:
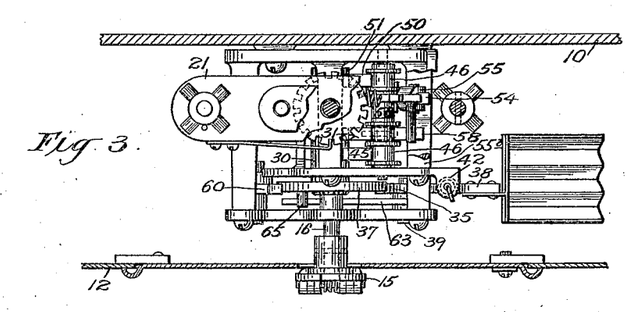
Figs. 3 and 4 are horizontal sectional views on lines 3 and 4 respectively of Fig. 1.
Figure 4:
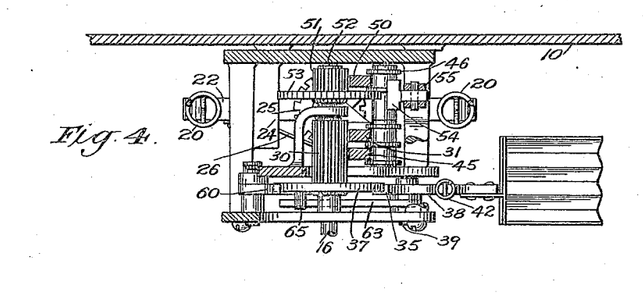
Figure 5:
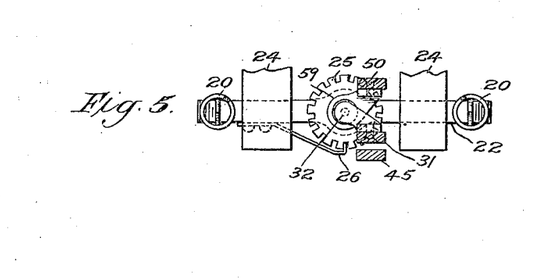
Fig. 5 is a detail sectional view on line 5 of Fig. 1.

In order to permit of the ready removal of the dial plate without necessitating the removal of the index or pointer 15 from the spindle 16 by which it is carried and which extends through a central opening in the dial, the index or pointer is formed of two sections which are pivoted on a pin 17 carried by lugs extending from a cap on the end of the spindle 16 and are normally spring held in their extended position as shown in Fig. 2, and which may be turned or folded together outward against the tension of the spring to permit the dial to be removed.

Figure 1:
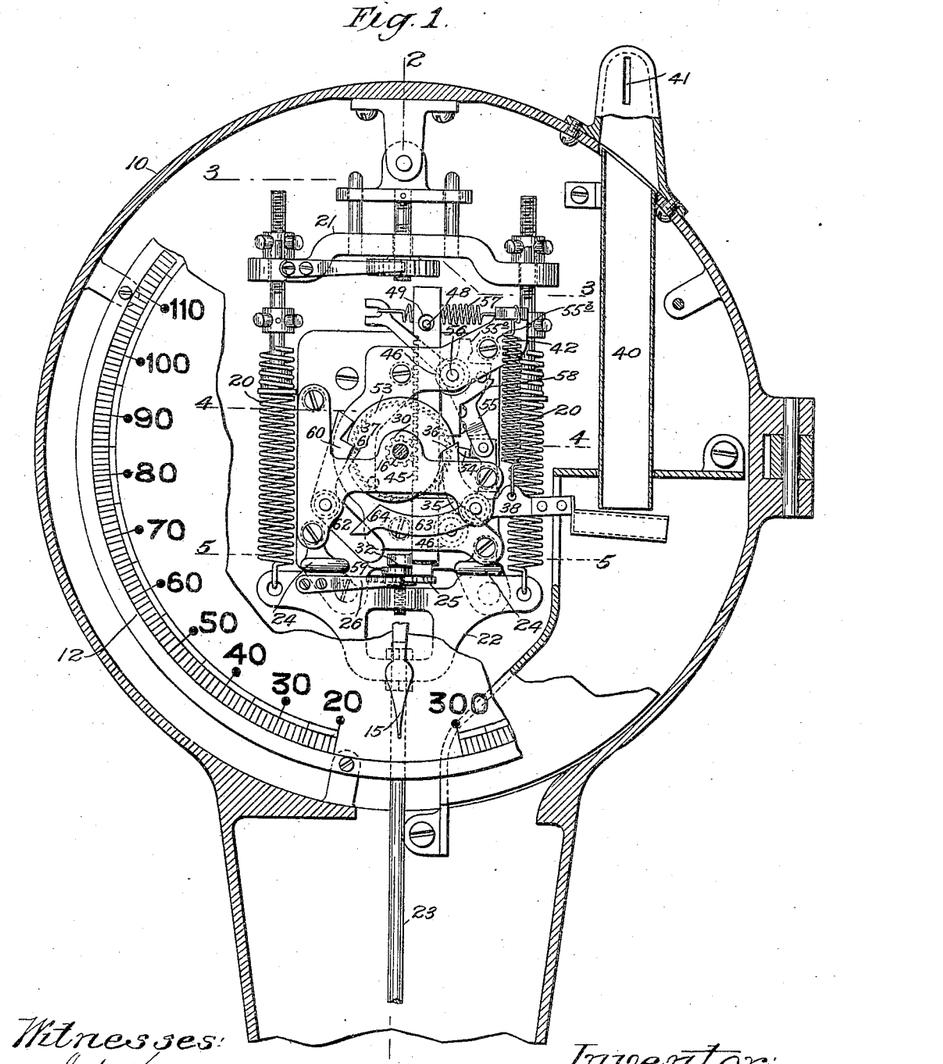
—Figure 1 is a front view with the casing shown in section on line 1 of Fig. 2 and with the dial plate partly broken away and with the operating mechanism shown in front elevation.

The weighing springs 20 are supported from a cross bar 21 and are connected at their lower ends to a cross-head 22 to which is connected the draft rod 23 which extends downward through the supporting column to the platform levers, not shown, of the scale. The weighing springs are connected to the supporting bar 21 by means providing for independently adjusting the tension of the springs, and the supporting bar is hung from the top of the casing by means providing for vertical adjustment of the same, as usual, for simultaneous adjustment of the springs. When there is no weight on the platform, the cross-head 22 is held by the springs 20 in its normal position as shown in Fig. 1 against stops 24. The cross-head 22 carries a horizontal vertically adjustable plate or disk 25 which acts as a stop for limiting the downward movement of a vertical sliding rack bar for operating the index or pointer, and another vertical sliding rack bar which will be hereinafter described. This stop plate or disk is preferably carried by a screw stem so that by turning the disk it may be raised or lowered relatively to the cross-head, as desired, and it is held in its adjusted position by a spring catch 26 which engages peripheral notches in the disk.

The index spindle carries fast thereon a pinion 30 which is engaged by a vertically movable rack bar 31, the lower end of which rack bar is provided with a lug which carries a pin 32 adapted to engage the stop plate 25 to limit the downward movement of the rack bar. The downward movement of this rack bar serves to turn the pinion 30 and the index spindle 16 and thereby swing the index or pointer 15 over the scale of the dial plate. When the cross-head 22 has been drawn downward against the tension of the springs 20 by the weight of a person or thing on the scale platform and the rack bar 31 is allowed to move downward under the influence of gravity until it is stopped by engagement of its pin 32 with the stop plate 25, the index 15 will then show on the dial scale the weight of the person or thing on the platform.

Figure 6:
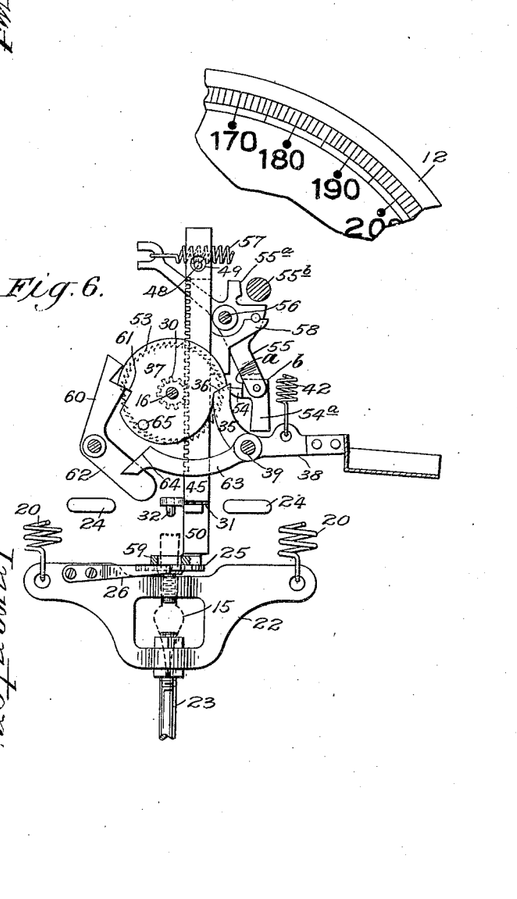
Fig. 6 is a front view of the operative parts shown in Fig. 1 showing the position of the same when a weight is on the scale platform but before the indicating mechanism has been released.
Figure 7:
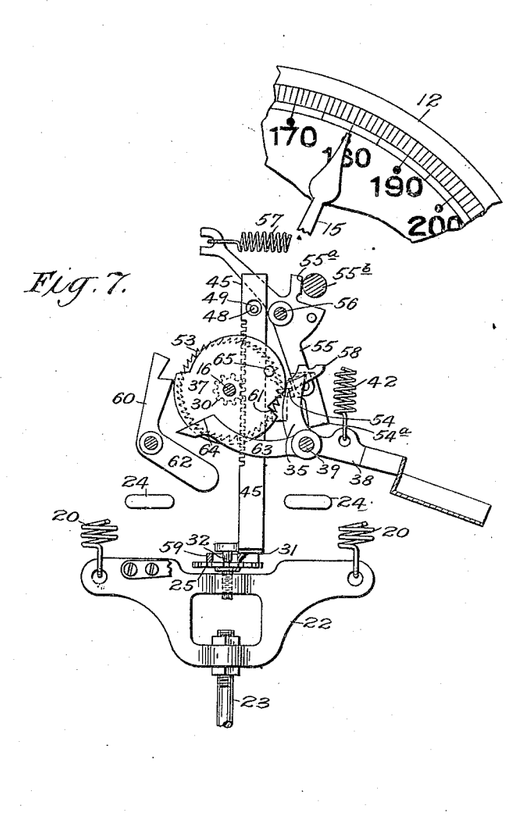
Fig. 7 is a similar view, but showing the parts in position just after the coin has been deposited and the index or pointer has been made to indicate the weight of the person or thing being weighed.

The downward movement of the index rack 31 and rotation of the spindle 16 is normally prevented by a latch or stop arm 35 mounted to engage a peripheral shoulder 36 of a disk 37 which is mounted on and secured to turn with the spindle 16 and pinion 30. The position of the stop arm 35 and location of the shoulder 36 in the periphery of the disk 37 are such that when the stop arm is engaged by the shoulder 36 the index or pointer 15 will be at the 0 position. The stop arm 35 is intended to be moved to release the disk in the construction shown by the insertion of a coin, and for this purpose the stop arm is carried by or mounted to be moved by a coin lever 38 which is pivotally mounted on a pin 39, the end of which coin lever extends beneath the open end of a coin chute 40 which is open to a coin slot 41 located at the upper part of the casing, and which coin lever normally rests in the position shown in Figs. 1 and 6 under tension of a spring 42 which serves to return the coin lever and hold it in this position. When the coin is deposited in the slot 41 it drops through the coin chute and hits the end of the coin lever 38 causing it to move downward to the position shown in Fig. 7, thereby throwing the end of the stop arm 35 out of engagement with the shoulder 36 of the disk 37 and releasing the disk and spindle 16 to permit the same to rotate and the rack bar 31 to move downward until stopped by the plate 25. When the coin lever has moved to the position shown in Fig. 7, the coin will drop off from the end thereof and the lever will then tend to move upward under tension of its spring 42, and the stop arm 35 will thereby be held against the periphery of the disk 37 and will be thrown into holding position as shown in Figs. 1 and 6 when the spindle and disk 37 have been rotated backward to carry the index back to 0 position by the upward movement of the rack bar when the weight is removed from the scale platform and cross-head 22 allowed to return to its normal position, as shown in Fig. 1.

In order to avoid lost motion between the teeth of the index rack and the teeth of the pinion 30 and to insure the rack teeth always engaging the same side of the teeth of the pinion when the rack is supported by the stop plate 25, a second rack 45 is provided mounted to move vertically and in engagement with the pinion 30. This rack is at all times supported solely by the teeth of the pinion and thereby acts to take up all lost motion between the index rack and the pinion whenever and in whatever position the index rack is supported by the stop plate 25. This rack 45 thus avoids the necessity of providing a spring for placing the index spindle under tension.

The rack bars 31 and 45 are guided by means of upper and lower flanged guide rolls 46 mounted to engage the edges of the bars opposite to the toothed edges. In order to insure the racks being always placed in proper relative position, one of the racks, as 31, is provided with a pin 48 which extends through an opening 49 in the rack, which opening is slightly larger than the pin so that while the racks will be entirely free from each other when in position, the insertion of the pin in the opening will serve to insure the proper relative position of the racks to each other when placed in engagement with the pinion.

For the purpose of preventing repeated weighing operations after the insertion of a single coin, or after the indicating mechanism has been otherwise released, means are provided whereby when the cross-head 22 has been brought to balancing position by a person or thing on the scale platform and the pointer has been allowed to move to indicating position by the insertion of a coin, any considerable further movement of the pointer from such indicating position or from any intermediate position to which it may be returned will be prevented. For this purpose there is provided, as in the machine of my former application, a third rack bar 50 mounted to move vertically and limited in its downward movement by the stop plate 25 and engaging a pinion 51 mounted to rotate independently of the spindle 16 on a pin 52 which forms the bearing for one end of the spindle 16. This pinion 51 has mounted to rotate with it a ratchet wheel or disk 53 which has its ratchet teeth pointing in the direction in which the disk is rotated by the downward movement of the rack bar 50. A pawl 54 adapted to engage the teeth of the disk 53 is carried by a swinging arm 55 which is pivotally mounted at 56 and is adapted to swing to carry the pawl into or out of engagement with the teeth of the disk. The pawl 54 is mounted in the arm 55 so as to be movable with the periphery of the disk 37 when in engagement therewith to a limited extent in either direction of movement of the disk, that is, either upward or downward in the construction shown, and to provide for such limited movement the pawl is preferably pivotally mounted in the arm 55 and when out of engagement with the teeth of the disk 37 is held in the position shown in Figs. 1 and 6 by means of a downwardly extending weighted tail piece 54$^a$, and from this position the pawl may be given a swinging movement the extent of which is limited by shoulders $a$ and $b$ formed on the pawl coming into engagement with corresponding shoulders on the supporting arm 55. The arm 55, under tension of a spring 57, tends to carry the pawl into position to co-act with the ratchet of the disk but is normally held against the tension of its spring in the position shown in Figs. 1 and 6 with the pawl clear of the ratchet teeth by means of an arm or stud 58 projecting from the upper end of the rack bar 31. When the cross-head 22 moves downward therefore while the rack bar 31 is in its normal or upper position, the rack bar 50 will be free to move downward and will move downward with the cross-head and will cause a corresponding rotation of the ratchet disk 53. When a coin is inserted, however, to release the index spindle and the index rack 31 starts on its downward movement, the projecting stud 58 frees the arm 55 and permits it to swing to carry the pawl 54 into engagement with the ratchet teeth of the disk 53, thereby locking the disk 53 and preventing any further downward movement of the rack bar 50 beyond such small further downward movement as corresponds to the limited downward movement which may be given to the pawl from its position when moved into engagement with the disk, plus a movement corresponding to what space there may be between the engaging edge of the pawl and the ratchet tooth directly above it. The movement of the arm 55 under the influence of its spring is limited, as by a stop lug 55$^a$ on the arm engaging a post 55$^b$, so as to prevent the pawl 54 being jammed against the ratchet wheel, because, if the arm were allowed to jam the pawl against the ratchet teeth, the desired limited movement of the ratchet wheel and rack bar 50 would be interferred with.

The lower end of the rack bar 50 is provided with an offset 59 which extends beneath the lug which carries the pin 32 at the lower end of the rack bar 31, and this lug on the rack bar 31 lies close to but not in engagement with the offset 59 when both rack bars are supported by the stop plate 25, so that if, after the indication of the weight of the person or thing on the platform has been given, the cross-head 22 is caused to move further downward by additional weight on the platform, further downward movement of the rack bar 31 and a corresponding movement of the index will be prevented by the engagement of the lug on the rack bar 31 with the offset 59 of the rack bar 50. Similarly, if after an indication of weight has been obtained, the cross-head 22 is by a change of weight allowed to return part-way and then caused to move downward again, the rack bar 50 being then held against downward movement by the pawl 54, the rack bar 31 and the index will remain about in the position to which they have been returned by the upward movement of the cross-head. It is desirable that the rack bars 31 and 50 should bear centrally on the plate 25, and for this purpose the offset 59 is preferably formed as shown to engage centrally of the plate and is formed with an opening through which the pin 32 of the rack bar 31 engages the plate.

This mechanism for preventing repeated weighing operations after the insertion of a single coin is similar to that shown in my said application No. 351,420, but differs therefrom in the means provided for locking the rack bar 50 against downward movement on the release of the rack bar 31. This difference consists principally in the use of locking means which permits a limited movement of the rack bar 50 from the position which it has at the time the locking means is brought into operation, this result being secured in the construction shown by arranging the locking pawl 54 to have a limited movement to permit a limited rotation of the disk 53 from the position it has when engaged by the pawl. The object of providing for such limited movement of the rack bar 50 from the position it has when the locking means is put into operation is to prevent any inaccuracy in the operation of the mechanism due to the addition of the weight of the rack bars 31 and 45 on the cross-head after the locking of the rack bar 50 or to the impact of the rack bar 31 on the supporting plate 25. It is found to be desirable in mechanisms of this kind to employ rack bars of considerable weight, and when such rack bars are employed, the addition of the weight of the rack bars 31 and 45 on the cross-head 22 causes an appreciable further downward movement of the cross-head from the position to which it has been moved by the weight on the platform. In the machine of my said application No. 351,420, a rigid locking pawl is provided for engaging the toothed periphery of the locking disk. In most cases this construction will give accurate indications of weight, and with the employment of very light rack bars in the indicating mechanism the results obtained would be practically correct in all cases. But when rack bars of sufficient weight to cause an appreciable downward movement of the cross-head are used, if the rigid locking pawl should have entered closely beneath a tooth of the locking disk, it might prevent part or all of the further downward movement which the rack bar 50 should make when the weight of the rack bars of the indicating mechanism come to the cross-head. By providing for a limited further downward movement of the rack bar 50, as in the present construction, this is prevented and the rack bar will always move downward with and remain in contact with the supporting plate 25 when the weight of the rack bars 31 and 45 comes on the cross-head. Furthermore, the impact of the rack bar 31 on the supporting plate 25 will cause the cross-head to be momentarily depressed slightly beyond the position to which it has been moved by the weight on the platform, and such impact and movement is apt to be followed by a rebound, causing a slight upward movement of the rack bar 50. The limited free upward movement of the locking pawl 54 permits this movement of the rack bar 50 without causing the pawl 54 to lose its position of engagement with the particular tooth of the disk 53 with which it has become engaged when moved into locking position. Obviously the advantages of this construction might be obtained to some extent by the use of locking means which would provide merely for a limited downward movement of the rack bar 50 from the position it has when the locking means is put into operation, but means providing for such limited movement in both directions is preferable, as will be readily understood.

In order to insure the indicating mechanism coming to rest with the index or pointer at 0 position and to lock such mechanism in this position, a pivoted locking pawl 60 is mounted in position to engage a shoulder 61 formed in the periphery of the disk 37 and facing in the opposite direction from the shoulder 36 with which the stop arm 35 engages. This pawl 60 tends to move in the direction toward the disk 37 under the influence of a balancing arm 62, and the pawl and the shoulder 61 are so positioned that when the shoulder 36 is against the end of the stop arm 35 and the index in the 0 position the shoulder 61 will be engaged by the end of the pawl 60 and the indicating mechanism will thus be locked against movement in either direction.

The shoulder 61 is preferably formed by a notch cut into the disk 37 from the periphery so as not to interfere with the movement of that portion of the periphery of the disk past the stop arm 35 during the forward movement of the indicating mechanism, and such notch is preferably of such form and of a size that the break in the periphery of the disk will be sufficiently short, so that if the parts of the indicating mechanism are caused to make a very quick return movement to normal position the pawl 60 will not be given time to move sufficiently into position to engage the shoulder 61 to stop the disk and the parts of the indicating mechanism will be allowed to continue their return movement slightly beyond their normal positions. This is for the purpose of insuring the return of the stop arm 35 to holding position beneath the shoulder 36. In most instances the stop arm 35 would be returned to this position when the parts of the indicating mechanism reach their normal position even if they were stopped in such position by engagement of the shoulder 61 with the pawl 60, but in case of a very quick return of the parts to normal position the striking of the shoulder 61 against the pawl 60 might cause a quick rebound before the stop arm 35 could enter beneath the shoulder 36. By so forming the notch for the shoulder 61 and balancing the pawl 60 that in case of a very quick return movement of the parts of the indicating mechanism the shoulder 61 will be allowed to move back slightly past the pawl 60, all possibility of the indicating mechanism not being locked in its normal position is avoided, since if ever the parts of the indicating mechanism make an over-return movement the weight of the racks 31 and 45 will immediately cause a slight forward movement until the shoulder 36 comes against the stop arm 35, in which position the pawl 60 will then fall beneath the shoulder 61 and the disk 37 and other parts of the indicating mechanism will then be securely locked in their normal position.

In order to insure the relocking of the indicating mechanism by the stop arm 35 against forward movement from the 0 position, the coin lever 38 and stop arm 35 are provided with an arm 63 extending beyond the pivotal point of the coin lever, which arm is provided with a cam face 64 adapted to co-act with a pin or lug 65 extending from the face of the disk 37, such cam face and lug being so positioned that if the coin lever should not move to throw the stop arm beneath the shoulder 36 immediately on the shoulder passing the end of the stop arm then the lug 65 will engage the cam face 64 and move the coin lever positively to throw the stop arm into engaging position.

The operation of the weighing machine is briefly as follows:—The parts normally rest in the position shown in Fig. 1, the indicator rack and spindle being locked in the position shown, and the cross-head 22 being held by the springs 20 against the stops 24 and being free to move with its connecting parts under the influence of a weight on the scale platform, and the rack bar 50 being free to move downward when permitted so to move by, and to a distance corresponding to, the downward movement of the cross-head 22 and the stop plate 25. When a person steps on the scale platform, or the thing to be weighed is placed on the scale platform, the cross-head 22 is drawn downward and comes to rest in a position of balance, and the rack bar 50 moves downward a corresponding distance, thereby rotating the toothed disk 53, such position of the parts being represented in Fig. 6. A coin being then inserted in the coin slot, drops through the coin chute and strikes the end of the coin lever 38 and tilts the same to the position shown in Fig. 7, thereby moving the stop arm 35 out of engagement with the disk 37 to release the index spindle and the indicating rack bar 31, whereupon the rack bar 31 and the rack bar 45 move downward until stopped by the pin 32 coming into engagement with the stop plate 25. The index spindle is thereby turned to swing the index or pointer 15 into position to indicate on the dial scale the weight of the person or thing being weighed, the cross-head 22 under the added weight of the rack bars 31 and 45 having moved downward a distance corresponding to the added weight of the rack bars. As the indicating rack bar starts to move downward the stud 58 carried by it moves out of engagement with the swinging arm 55 and allows such arm to move under tension of its spring 57 to carry the locking pawl 54 into engagement with the toothed periphery of the disk 53, thereby locking the rack bar 50 against further downward movement, except to the extent heretofore pointed out. This rack bar 50 being thus locked against movement, any subsequent considerable further downward movement of the cross-head under the influence of additional weight on the scale platform will not be indicated by a corresponding movement of the index or pointer, since the offset 59 of the rack bar 50 will then prevent further downward movement of the indicating rack bar 31 to correspond with such further downward movement of the cross-head. As the rack bar 50 is locked only against downward movement by engagement of the pawl 54 with the toothed disk 53, it is at all times free to be moved upward again and does not interfere with upward movement of the cross-head 22 from any position to which it has been accompanied by the rack bar 50 in its downward movement. If, however, the cross-head moves upward any considerable distance part-way from the position of balance which it had at the time the coin was inserted and then is moved downward again, the rack bar 50 will be held from making a second corresponding downward movement and will in turn prevent downward movement of the indicating rack bar. It will be impossible, therefore, to beat the weighing machine and obtain the weight of two persons or articles in succession for the insertion of a single coin, or after the indicating mechanism has been otherwise released, by placing a second person or article on the platform after the weight of the first person or article has been obtained, unless the weight of the second person or article is the same within a few pounds as the first person or article. Similarly, it will be impossible to beat the weighing machine by changing the weight on the platform so as to allow the index to move part-way back with the intention of then causing it to move forward again over the dial scale. When the weight is removed from the platform, the cross-head returns to its normal position against the stops 24, thereby raising the rack bars and returning the index or pointer to 0 position, in which position it then becomes locked as hereinbefore explained. As the indicating rack bar reaches the end of its upward movement, its stud 58 will again engage the swinging arm 55 and move the same to withdraw the pawl 54 from engagement with the disk 53, thereby unlocking the rack bar 50 and leaving it free to move downward again when permitted so to move by any downward movement of the cross-head 22.

The tension of the weighing springs is preferably adjusted so that when the cross-head is raised against the stops 24 the springs will be under some tension so as to hold the cross-head close against the stops. A tension of the springs corresponding to a weight of ten pounds on the scale platform is found desirable, and the mechanism is shown as intended to be adjusted for such tension of the springs, the dial scale being arranged so that the first movement of the index or pointer from the 0 position for a distance corresponding to an increase of ten pounds weight on the scale platform will bring the pointer to the twenty pound point on the dial scale, that is, any weight on the platform up to ten pounds will not cause any movement of the index, but a twenty pound weight on the platform will cause the index to move to indicate twenty pounds on the dial scale.

It will be understood that the invention is not to be limited to the exact construction, arrangement and combination of parts, as shown, but that it includes changes and modifications thereof within the claims.

What is claimed is:

1. The combination with a weighing mechanism, of indicating means, a movable member for controlling the operation of said indicating means and adapted to be limited in its forward movement by a part of the weighing mechanism and normally held against movement, means for releasing said movable member, a second movable member normally free to move with and adapted to be limited in its movement by said part of the weighing mechanism, means controlled by the movement of the first movable member for locking the second movable member against forward movement and adapted to permit a limited forward movement of said second movable member from the position it has when said locking means comes into operation, and means for limiting the forward movement of the first movable member relatively to the second movable member.

2. The combination with a weighing mechanism, of indicating means, a movable member for controlling the operation of said indicating means and adapted to be limited in its forward movement by a part of the weighing mechanism and normally held against movement, means for releasing said movable member to permit it to make the movement to which it is limited by said part of the weighing mechanism, and locking means for locking said movable member against forward movement when it has made the movement to which it is limited by said part of the weighing mechanism, said locking means being adapted to permit a limited forward movement of said movable member from the position it has when said locking means comes into operation.

3. The combination with a weighing mechanism, of indicating means, a movable member for controlling the operation of said indicating means and adapted to make its forward movement after the weighing mechanism has been moved by the thing being weighed and adapted to be limited in such forward movement by a part of the weighing mechanism, means for locking said movable member against forward movement after it has made the movement to which it is limited by said part of the weighing mechanism, said locking means being adapted to permit a limited forward movement of said movable member from the position it has when said locking means comes into operation.

4. The combination with a weighing mechanism, of indicating means, a movable member for controlling the operation of said indicating means according to the position of a part of the weighing mechanism, and means for locking said movable member to prevent forward movement thereof after a weight has been indicated, said locking means being adapted to permit a limited forward movement of said movable member from the position it has when said locking means comes into operation.

5. In a weighing machine, the combination with indicating means, of means for locking said indicating means to prevent forward movement thereof after a weight has been indicated, said locking means being adapted to permit a limited forward movement of the indicating means from the position it has when said locking means comes into operation.

6. The combination with a movable member, of indicating means for indicating the amount of movement of said member, a second movable member for controlling the operation of said indicating means and adapted to be limited in its forward movement by the first movable member and normally held against movement, means for releasing said second movable member, a third movable member normally free to move with and adapted to be limited in its movement by the first movable member, means for locking the third movable member against forward movement adapted to permit a limited forward movement of said member from the position it has when said locking means comes into operation, and means for limiting the forward movement of the second movable member relatively to the third movable member.

7. The combination with a movable member, of indicating means for indicating the amount of movement of said movable member, a second movable member for controlling the operation of said indicating means according to the position of the first movable member, and means for locking said second movable member to prevent forward movement thereof after the position of the first movable member has been indicated, said locking means being adapted to permit a limited forward movement of said second movable member from the position it has when said locking means comes into operation.

8. The combination with a movable member, of indicating means for indicating the amount of movement of said movable member, and means for locking said indicating means to prevent forward movement thereof after the position of said movable member has been indicated, said locking means being adapted to permit a limited forward movement of said locking means from the position it has when said locking means comes into operation.

9. The combination with a movable member, of indicating means for indicating the amount of movement of said member, a second movable member for controlling the operation of said indicating means and adapted to be limited in its forward movement by the first movable member, means for holding said second movable member against movement during the movement of the first movable member and for releasing said second movable member to permit it to make its operative movement, a third movable member normally free to move with and adapted to be limited in its movement by the first movable member, a ratchet and pawl locking means adapted to prevent forward movement of the third movable member, said ratchet and pawl being normally disengaged and one of them being adapted to be given a limited movement to permit a limited forward movement of the third movable member after the ratchet and pawl are brought into engagement, means controlled by the movement of the second movable member for causing operative engagement of said ratchet and pawl, and means for limiting the forward movement of the second movable member relatively to the third movable member.

10. The combination with a movable member, of indicating means for indicating the amount of movement of said member, a ratchet and pawl locking means adapted to prevent forward movement of said indicating means, said ratchet and pawl being normally disengaged and one of them being adapted to be given a limited movement to permit a limited forward movement of the indicating means after the ratchet and pawl are brought into engagement, and means for causing operative engagement of said ratchet and pawl after a movement of the movable member has been indicated.

11. The combination with a weighing mechanism, of indicating means, a movable member for controlling the operation of said indicating means and adapted to be limited in its forward movement by a part of the weighing mechanism and normally held against movement, means for releasing said movable member, a second movable member normally free to move with and adapted to be limited in its movement by said part of the weighing mechanism, a ratchet and pawl locking means adapted to lock the second movable member against forward movement, said ratchet and pawl being normally disengaged and one of them being adapted to be given a limited movement to permit a limited forward movement of the second movable member after the ratchet and pawl are brought into engagement, means controlled by the movement of the first movable member for causing operative engagement of said ratchet and pawl, and means for limiting the forward movement of the first movable member relatively to the second movable member.

12. The combination with a weighing mechanism, of indicating means, a movable member for controlling the operation of said indicating means and adapted to make its forward movement after the weighing mechanism has been moved by the thing being weighed and adapted to be limited in such forward movement by a part of the weighing mechanism, a ratchet and pawl locking means adapted to prevent forward movement of said movable member after it has made the movement to which it is limited by said part of the weighing mechanism, said ratchet and pawl being normally disengaged and one of them being adapted to be given a limited movement in either direction from a position in which it is normally held to permit a limited movement in either direction of said movable member after the ratchet and pawl are brought into operative engagement.

13. The combination with a movable member, of indicating means for indicating the amount of movement of said member, a ratchet and pawl locking means adapted to prevent forward movement of said indicating means, said ratchet and pawl being normally disengaged and one of them being adapted to be given a limited movement in either direction from the position in which it is normally held to permit a limited movement in either direction of the indicating means after the ratchet and pawl are brought into engagement, and means for causing operative engagement of said ratchet and pawl after the movement of said movable member has been indicated.

14. In a weighing machine, the combination of the indicating rack 31 normally held against movement, the rack 50 normally free to move with the weighing mechanism, means for limiting the forward movement of the indicating rack relatively to the rack 50, means for releasing the indicating rack, and means controlled by the movement of the indicating rack for locking the rack 50 against forward movement, said locking means being adapted to permit a limited forward movement of the rack 50 from the position it has when said locking means comes into operation.

15. In a weighing machine, the combination of the indicating rack 31 normally held against movement, the rack 50 normally free to move with the weighing mechanism, means for limiting the forward movement of the indicating rack relatively to the rack 50, means for releasing the indicating rack, a ratchet connected to move with the rack 50, a pawl 54 adapted to engage said ratchet to prevent forward movement of the rack 50, said pawl being normally held out of engagement with the ratchet and being adapted to be given a limited movement in either direction of the movement of the ratchet after being brought into engagement with the ratchet, and means controlled by the movement of the indicating rack for bringing the pawl into engagement with the ratchet.

16. The combination of the ratchet 53, the pawl 54, and a member on which the pawl is mounted, said member being normally in position to hold the pawl out of engagement with the ratchet, and the pawl being mounted on said member so as to be capable of a limited movement in either direction of the movement of the ratchet after being brought into engagement with the ratchet.

17. The combination of a movable member, a ratchet connected to have a movement corresponding to the movement of said member, a locking pawl for engaging said ratchet, a support by which said pawl is carried, said support being movable to carry the pawl into and out of engagement with the ratchet and said pawl being mounted on the support so as to be capable of a limited movement in either direction of the movement of the ratchet after being brought into engagement with the ratchet, means for moving the support to carry the pawl into engagement with the ratchet, and means for limiting such movement to prevent the pawl being jammed against the ratchet.

18. The combination of the ratchet 53, a pivoted arm 55, a pawl 54 mounted in said arm and adapted to be given a limited movement in either direction of the movement of the ratchet after being brought into engagement with the ratchet by the movement of said arm, means for holding the arm in position with the pawl out of engagement with the ratchet, a spring for moving the arm to carry the pawl into engagement with the ratchet when released by said means, and a stop for limiting the movement of the arm under the influence of the spring to prevent the pawl being jammed against the ratchet.

19. The combination with a movable member, of the rack 31 normally held against movement, the rack 50 normally free to move with the movable member, means for limiting the forward movement of the rack 31 relatively to the rack 50, a ratchet arranged to move with the rack 50, a swinging arm 55, a pawl 54 carried by the arm 55 and adapted to engage the ratchet 53, means for holding the swinging arm 55 in position with the pawl out of engagement with the ratchet when the rack 31 is in its normal position and for releasing said arm to permit it to move to carry the pawl into engagement with the ratchet when the rack 31 moves away from its normal position, said pawl being adapted to be given a limited movement in either direction of the movement of the ratchet from a position in which it is normally held.

20. In a weighing machine, the combination of indicating means, a part moving with said indicating means, a shoulder on said part, a stop device for engaging said shoulder to prevent forward movement of the indicating means from the 0 position, means for moving said stop device out of engaging position, a second oppositely facing shoulder on said part, and a stop device for engaging said second shoulder to lock the indicating means against backward movement from the 0 position.

21. In a weighing machine, the combination of indicating means, a part moving with said indicating means, a shoulder on said part, a stop device for engaging said shoulder to prevent forward movement of the indicating means from the 0 position, said stop device tending to move into engaging position, means for moving said stop device out of engaging position to permit the indicating means to make its forward movement, and means for positively moving said stop device into engaging position when the shoulder has been moved back of the stop device.

22. In a weighing machine, the combination of indicating means, a part moving with said indicating means, a shoulder on said part, a stop device for engaging said shoulder to prevent forward movement of the indicating means from 0 position, means for moving said stop device out of engaging position to permit the indicating means to make its forward movement, and means for positively moving said stop device into engaging position when the shoulder has been moved back of the stop device.

23. In a weighing machine, the combination of indicating means, a part moving with said indicating means, a shoulder on said part, a spring pressed stop arm 35 for engaging said shoulder to prevent forward movement of the indicating means from the 0 position, means for moving said stop arm out of engaging position to permit the indicating means to make its forward movement, and means for moving said stop arm into engaging position when the shoulder has been moved back of the stop arm.

24. In a weighing machine, the combination of indicating means, a part moving with said indicating means, a shoulder on said part, a stop device for engaging said shoulder to prevent the indicating means from moving forward from the 0 position, means for moving said stop device out of engaging position to permit the indicating means to make its forward movement, and means operated by return movement of the indicating means for moving said stop device into engaging position when the shoulder has been moved back of the stop device.

25. In a weighing machine, the combination of indicating means, locking means for preventing forward movement of the indicating means from the 0 position, said locking means including a stop device and a member for co-acting therewith, one of such parts of the locking means moving with the indicating means, and means operated by the return movement of the indicating means for moving the stop device of the locking means into engaging position when the indicating means has been moved back of 0 position.

26. In a weighing machine, the combination of indicating means, locking means for preventing forward movement of the indicating means from the 0 position, said locking means including a stop device and a member for co-acting therewith, the stop device tending to move into engaging position and one of such parts of the locking means moving with the indicating means, means for releasing the indicating means to permit it to make its forward movement, and means for moving the stop device into engaging position when the indicating means has been moved back of 0 position.

27. In a weighing machine, the combination of indicating means, a part moving with said indicating means, a shoulder on said part, a stop device for engaging said shoulder to prevent forward movement of the indicating means from 0 position, means for moving said stop device out of engaging position to permit the indicating means to make its forward movement, means operated by return movement of the indicating means for moving said stop device into engaging position when said shoulder has been moved back of the stop device, a second oppositely facing shoulder on said part of the indicating means, and a stop device for engaging said second shoulder to lock the indicating means against backward movement from the 0 position.

28. In a weighing machine, the combination of indicating means, a part moving with said indicating means, a shoulder on said part, a stop device for engaging said shoulder to prevent forward movement of the indicating means from 0 position, means for moving said stop device out of engaging position to permit the indicating means to make its forward movement, means operated by return movement of the indicating means for moving said stop device into engaging position when said shoulder has been moved back of the stop device, a second oppositely facing shoulder on said part of the indicating means, a stop device for engaging said second shoulder to lock the indicating means against backward movement from the 0 position, said second shoulder and said last mentioned stop device being formed to prevent engagement of the shoulder by the stop device on a quick return of the parts of the indicating means to 0 position.

29. The combination with a weighing mechanism, of indicating means, a movable member for controlling the operation of said indicating means and adapted to be limited in its forward movement by a part of the weighing mechanism, a spring pressed stop arm 35 for holding said movable member normally against movement with the indicating means in 0 position by engagement with a shoulder formed on a part moving with said movable member, means for moving said stop arm to release said movable member, a second movable member free to move with and adapted to be limited in its movement by said part of the weighing mechanism, means controlled by the movement of the first movable member for locking the second movable member against forward movement and adapted to permit a limited forward movement of said second movable member from the position which it has when said locking means comes into operation, means for limiting the forward movement of the first movable member relatively to the second movable member, means operated by return movement of said movable member for moving said stop arm into engaging position when said shoulder has been moved back of said stop arm, and a stop arm for engaging a second and oppositely facing shoulder on said part moving with said movable member to lock the indicating means against backward movement from the 0 position.

30. In a weighing machine, the combination of indicating means, a locking disk 37 moving with said indicating means and having two oppositely facing shoulders 36 and 61, a stop arm 35 for engaging the shoulder 36 to prevent forward movement of the indicating means from the 0 position, a stop pawl 60 for engaging the shoulder 61 to prevent backward movement of the indicating means from the 0 position, an arm 63 connected with the stop arm 35, and a lug 65 on the disk 37 in position to engage the arm 63 to throw the stop arm 35 into engaging position when the shoulder 36 passes the end of the stop arm on the return movement of the disk 37.

In testimony whereof, I have hereunto set my hand, in the presence of two subscribing witnesses.

WILLIAM W. ROSENFIELD.

Witnesses:
A. L. KENT,
T. F. KEHOE.